(12) United States Patent
Azizi et al.

(10) Patent No.: US 9,883,473 B2
(45) Date of Patent: Jan. 30, 2018

(54) CONVEYING INFORMATION TO BANDWIDTH LIMITED DEVICE

(71) Applicant: Intel IP Corporation, Santa Clara, CA (US)

(72) Inventors: Shahrnaz Azizi, Cupertino, CA (US); Chittabrata Ghosh, Fremont, CA (US); Thomas J. Kenney, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 89 days.

(21) Appl. No.: 14/973,217

(22) Filed: Dec. 17, 2015

(65) Prior Publication Data

US 2017/0111875 A1    Apr. 20, 2017

Related U.S. Application Data

(60) Provisional application No. 62/243,241, filed on Oct. 19, 2015.

(51) Int. Cl.
*H04W 56/00* (2009.01)
*H04L 5/00* (2006.01)
*H04W 72/04* (2009.01)

(52) U.S. Cl.
CPC ......... *H04W 56/001* (2013.01); *H04L 5/0007* (2013.01); *H04W 72/0446* (2013.01)

(58) Field of Classification Search
CPC ......... H04W 56/001–56/0025; H04W 72/042; H04W 72/0446; H04W 84/12; H04L 5/0007
See application file for complete search history.

(56) References Cited

U.S. PATENT DOCUMENTS

2016/0302185 A1* 10/2016 Sun .................. H04L 5/0007
2016/0380731 A1* 12/2016 Kim .................. H04L 5/0007
                                                        370/329
2017/0105229 A1*  4/2017 Luo .................. H04W 72/121

* cited by examiner

*Primary Examiner* — Pao Sinkantarakorn
(74) *Attorney, Agent, or Firm* — Schwegman Lundberg & Woessner, P.A.

(57) ABSTRACT

Generally discussed herein are devices and methods for providing devices with packet duration and/or transmit and/or receive time frame information. An apparatus can include processing circuitry and transceiver circuitry configured to generate a packet for transmission on one or more sub-channels for one or more stations, each sub-channel comprising a common wake-up physical synchronization, a station dedicated wake-up preamble, and a packet length, wherein each station dedicated wake-up preamble comprises a wake-up identifier for a station of the one or more stations and the packet length indicates a duration of the packet, and wherein a station of the one or more stations includes a receive bandwidth of less than twenty megaHertz, and transmit the packet to the one or more stations during a transmission opportunity (TXOP) obtained by the AP.

20 Claims, 8 Drawing Sheets

CONVEYING INFORMATION TO BANDWIDTH LIMITED DEVICE

PRIORITY CLAIM

This application claims the benefit of priority under 35 USC 119(e) to U.S. Provisional Patent Application Ser. No. 62/243,241, filed Oct. 19, 2015, which is incorporated herein by reference in its entirety.

TECHNICAL FIELD

Embodiments pertain to wireless networks, such as wireless local area networks (WLAN). Some embodiments relate to wireless local area networks (WLANs) and Wi-Fi networks including networks operating in accordance with the IEEE 802.11 family of standards, such as the IEEE 802.11ac standard, the IEEE 802.11ax task group named High Efficiency WLAN (HEW) or IEEE 802.11ay. Some embodiments relate to high-efficiency (HE) wireless or high-efficiency WLAN or Wi-Fi (HEW) communications. One or more embodiments relate for Internet of Things (IoT) stations that may be IEEE 802.11ax stations, Low Power (LP) or Low Power Long Range (LPLR) stations.

BACKGROUND

Adapting standards to coexist with legacy devices is a challenging endeavor. Creating ways to allow the legacy devices to be used along with new next generation devices without incurring too much overhead or affecting user experience can be even more challenging.

The Internet of Things (IoT) is enabling many wireless devices to be deployed in wireless local-area network (WLAN). However, the IoT wireless devices are often battery constrained and yet need to communicate with central devices to download and upload data. Additionally, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements.

DESCRIPTION

Figure 1:
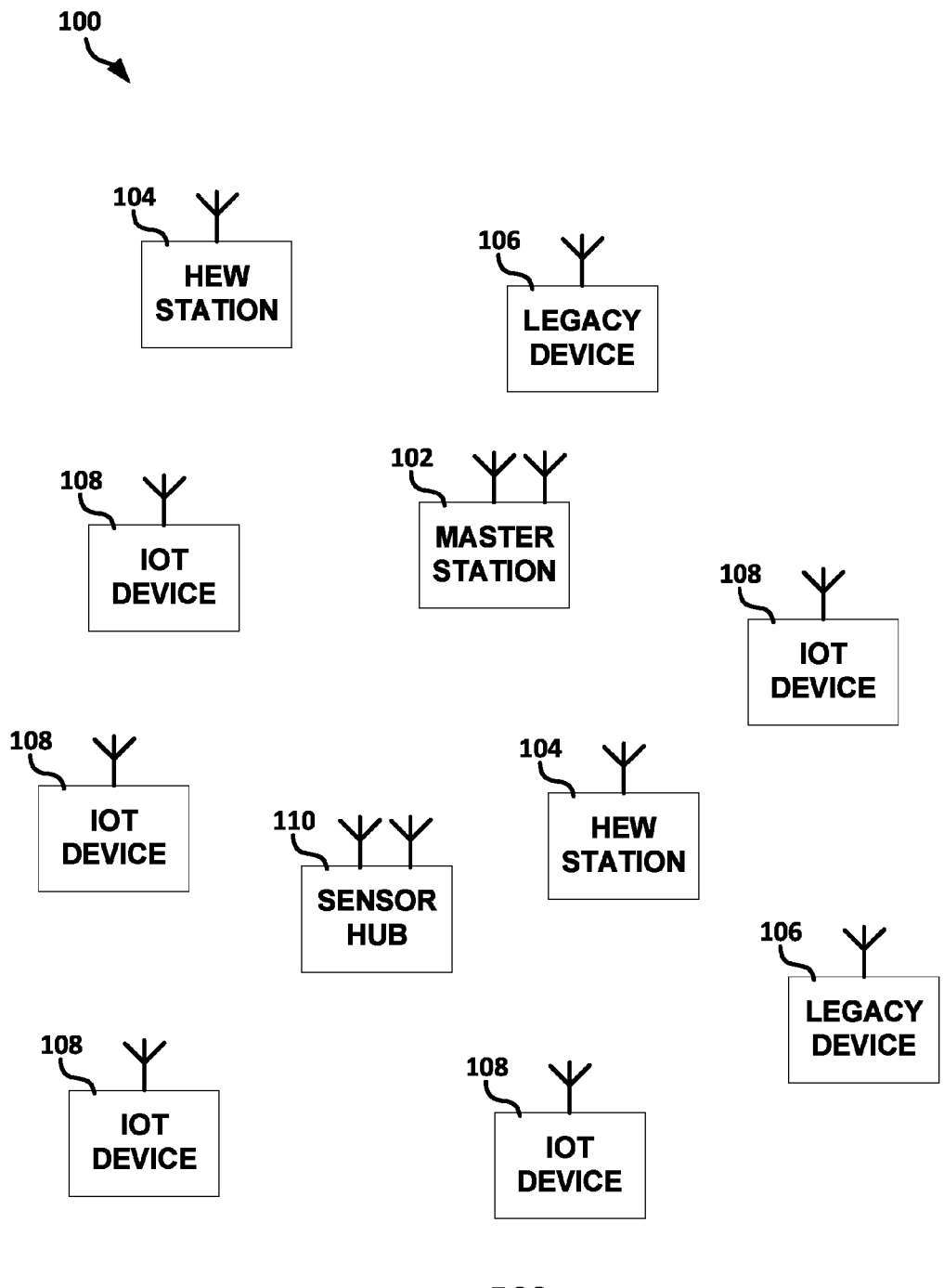
FIG. 1 illustrates a wireless network in accord with one or more embodiments.

The following description and the drawings sufficiently illustrate specific embodiments to enable those skilled in the art to practice them. Other embodiments may incorporate structural, logical, electrical, process, and other changes. Portions and features of one or more embodiments may be included in, or substituted for, those of other embodiments. Embodiments set forth in the claims encompass all available equivalents of those claims.

In transmitting a preamble over a 20 MHz or greater bandwidth, devices that have a receive bandwidth of less than 20 MHz will not be able to decode the preamble or other information transmitted at that bandwidth.

Examples in this disclosure relate generally to informing a device of a duration of a packet, such as when the device includes a low receive bandwidth (i.e. less than 20 MHz). In one or more embodiments, the device includes an internet of things (IoT) device. One or more embodiments improve upon devices that operate in conformance with an 802.11 standard. One or more embodiments are directed specifically to providing a packet duration using a long-range, low-power (LRLP) device. LRLP devices conform to standards proposed by the LRLP interest group and adopted into the 802.11 standard.

A goal of the LRLP standard is to help enable low power operation for Wi-Fi enabled devices and/or extending a range of operation for the Wi-Fi devices. The LRLP interest group is concerned with devices different from devices in the 802.11ah standard in that the LRLP interest group is targeting operations in the 2.4 and 5 GHz bands. The LRLP standard can thus apply to legacy devices, which is not a concern in 802.11ah.

One goal for the LRLP interest group is to allow these devices to operate with a bandwidth of less than 20 MHz. Different from devices that conform to the 802.11ax, where operation using Orthogonal Frequency-Division Multiple Access (OFDMA) allowed devices to operate using a smaller subset of their bandwidth but still required a larger overall bandwidth for operation, an object of the LRLP standard is to enable devices that only operate with a smaller bandwidth (i.e. smaller than 20 MHz) to operate using the LRLP standard. Thus, mechanisms that allow such operation for next generation and legacy devices is desired.

Discussed herein are methods and apparatuses to convey packet duration to LRLP devices with a bandwidth smaller than 20 MHz. When the receive bandwidth of an LRLP device is smaller than 20 MHz, it cannot decode the legacy portion of the preamble. Here, "Legacy" refers to all previous Wi-Fi specification amendments including 11ax receiving frames at bandwidth higher or equal to 20 MHz. Hence as discussed herein are methods to convey packet duration and/or transmission opportunity (TXOP) duration to these LRLP devices outside of the method currently done, which uses the legacy fields of the preamble. The LRLP devices will not be able to decode the preamble because the receive bandwidth is less than a minimum 20 MHz bandwidth required to decode the legacy preamble.

Devices adhering to the current Wi-Fi standards, specifically in the 2.4 and 5 GHz bands, there is no mode where a device can operate using a fully narrow band transmitter or receiver. A narrow band device defined herein is any device only being able to transmit and receive a bandwidth less than 20 MHz. In current Wi-Fi, even for devices conforming to 802.11ax, all devices must be able to transmit and receive at least 20 MHz and sometimes even larger than 20 MHz.

The AP (master station) can access media and spoofs legacy devices for ongoing DL transmission to LRLP devices as well as subsequent UL transmissions from LRLP devices. This can be accomplished by including a legacy preamble in an AP transmission to STA devices (legacy and LRLP devices). In case of multiplexing LRLP devices, such as in accord with the currently defined 802.11ax OFDMA structure, the LRLP device appears just like another 802.11ax STA from the viewpoint of other 802.11ax devices. Therefore 802.11ax devices, which understand the legacy preamble (because the preamble includes an 802.11ax HE preamble), will defer correctly during the duration of an "LRLP only operation" time period. However, an LRLP STA with a bandwidth smaller than 20 MHz cannot decode the legacy portion of the LRLP compatible packet. It can only decode and interpret the packet after detecting an LRLP preamble. Such LRLP may benefit from knowing a duration of its receiving packet and possibly a duration of LRLP operation.

FIG. 1 illustrates a WLAN 100 in accord with one or more embodiments. The WLAN may comprise a basis service set (BSS) 100 that may include a master station 102, which may be an AP, a plurality of high-efficiency wireless (HEW) (e.g., IEEE 802.11ax) STAs 104, a plurality of legacy (e.g., IEEE 802.11n/ac) devices 106, a plurality of IoT devices 108 (e.g., IEEE 802.11ax), and a sensor hub 110.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accord with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In one or more embodiments, the HEW STAs 104 may be termed high efficiency (HE) stations.

The master station 102 may communicate with legacy devices 106 in accord with legacy IEEE 802.11 communication techniques. In example embodiments, the master station 102 may also be configured to communicate with HEW STAs 104 in accord with legacy IEEE 802.11 communication techniques.

The IoT devices 108 may operate in accord with 802.11ax or another standard of 802.11. The IoT devices 108 may operate on a smaller sub-channel than other HEW stations 104. For example, the IoT devices 108 may operate on about 2.03 MHz or about 2.6 MHz sub-channels. In one or more embodiments, the IoT devices 108 are not able to transmit on a 20 MHz sub-channel to the master station 102 with sufficient power for the master station 102 to receive the transmission. In one or more embodiments, the IoT devices 108 are not able to receive on a 20 MHz sub-channel and use a narrow sub-channel such as can include about a 2.03 MHz or about a 2.6 MHz bandwidth.

The IoT devices 108 may be battery constrained. The IoT devices 108 may be sensors designed to measure one or more specific parameters of interest such as temperature sensor, humidity, etc. The IoT devices 108 may be location-specific sensors. One or more IoT devices 108 may be connected to a sensor hub 110. The IOT devices 108 may upload data to the sensor hub 110. The sensor hubs 110 may upload the data to an access gateway (not illustrated) that connects several sensor hubs 110 and can connect to a cloud sever. The master station 102 may act as the access gateway in accord with one or more embodiments. The master station 102 may act as the sensor hub 110 in one or more embodiments.

In one or more embodiments, the IoT devices 108 can consume a relatively small amount of average power in order to perform a frame exchange with the sensor hub 110 and/or master station 102. The IoT devices 108 may be densely deployed.

In one or more embodiments, the IoT devices 108 may have different sleep states. For example, the IoT devices 108 may have three sleep states, such as can include a micro sleep state, a shallow sleep state, and a deep sleep state. In the micro sleep state the IoT device 108 may decode the PHY preamble and determine whether a packet is relevant to the IoT device 108 and enter the micro sleep state for the duration of the physical layer convergence procedure (PLCP) protocol data unit (PPDU) if the packet is not relevant to the IoT device 108. For example, the IoT device 108 may go into the micro sleep state for a duration of a single uplink (UL) or downlink (DL) packet, or a duration of a spatial re-use in an overlapping BSS (OBSS).

In the shallow sleep state the IoT device 108 determines a protection duration from the first packet and enters this sleep state until an end of that duration. For example, the IoT device 108 may receive a trigger frame and enter the shallow sleep for the duration of a transmission opportunity. In a deep sleep state the IoT device 108 may enter a sleep state for one or multiple beacon intervals.

In one or more embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In one or more embodiments, the bandwidth of a subchannel may be less than 20 MHz. For example, the bandwidth of a sub-channel may be equivalent to one of the OFDMA subchannels defined in IEEE 802.11ax. The OFDMA channels of IEEE 802.11ax that are less than 20 MHz are equal to 26-tone, 52-tone, and 106-tone allocations. Other tone allocations are possible, such as when using a higher point FFT (e.g., 512 or 1024 point FFT or the like). In these higher point examples, 242 tones, 484 tones, and even 996 tones are possible.

The bandwidth of some OFDMA allocations are 20 MHz divided by 256 (due to size of a Fast Fourier Transform (FFT)) times the number of tones, so about 2.03125 MHz or larger, such as about 2.6 MHz, 4.0625 MHz, and 8.28125 MHz, respectively. Note that a bandwidth that is a combination of those bandwidths or a bandwidth that is less than or equal to the available bandwidth may also be used. In one or more embodiments, the bandwidth of the subchannels may be based on a number of active subcarriers. In one or more embodiments the bandwidth of each of the subchannels is multiples of 26 (e.g., 26, 52, 104, etc.) active subcarriers or tones that can be spaced by 1/256 of 20 MHz. In the case where 26-tones are used, there may be up to seven direct conversational (DC) nulls in the center of the 26-tones. The bandwidth for such a seven DC null, 26-tone allocation is about 2.6 MHz (33 times the subcarrier spacing of 20 MHz/256). In one or more embodiments the bandwidth of the subchannels is 256 tones spaced over 20 MHz. In one or more embodiments the subchannels are a multiple of 26 tones or a multiple of 20 MHz. In one or more embodiments, a 20 MHz subchannel may comprise 256 tones for a 256 point Fast Fourier Transform (FFT).

A HEW frame may be configured for transmitting a number of spatial streams, which may be formatted in accord with MU-MIMO. In other embodiments, the master station 102, HEW STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

One or more embodiments relate to HEW communications. In accord with one or more IEEE 802.11ax embodiments, a master station 102 may operate as a master station which may be arranged to contend for a wireless medium (e.g., during a contention period) to receive exclusive control of the medium, such as for a HEW control period. In one or more embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accord with a non-contention based multiple access technique such as OFDMA or MU-MIMO. This is unlike conventional WLAN communications in which devices communicate in accord with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accord with one or more embodiments, during the master-sync transmission the HEW STAs 104 may contend for the wireless medium, such as with the legacy devices 106 being excluded from contending for the wireless medium during the master-sync transmission. In one or more embodiments, the trigger frame may indicate an uplink (UL) UL-MU-MIMO and/or UL OFDMA control period.

In one or more embodiments, the multiple-access technique used during the HEW control period may be a scheduled OFDMA technique, although this is not a requirement. In one or more embodiments, the multiple access technique may be a time-division multiple access (TDMA) technique or a frequency division multiple access (FDMA) technique. In one or more embodiments, the multiple access technique may be a space-division multiple access (SDMA) technique.

The master station 102 may additionally or alternatively communicate with legacy stations 106 and/or HEW stations 104 in accord with legacy IEEE 802.11 communication techniques. In one or more embodiments, the master station 102 may also be configurable to communicate with HEW stations 104 outside the HEW control period in accord with legacy IEEE 802.11 communication techniques, although this is not a requirement. In example embodiments, the HEW device 104 and/or the master station 102 are configured to perform the methods and functions herein described with regard to FIGS. 1-7.

Figure 2:
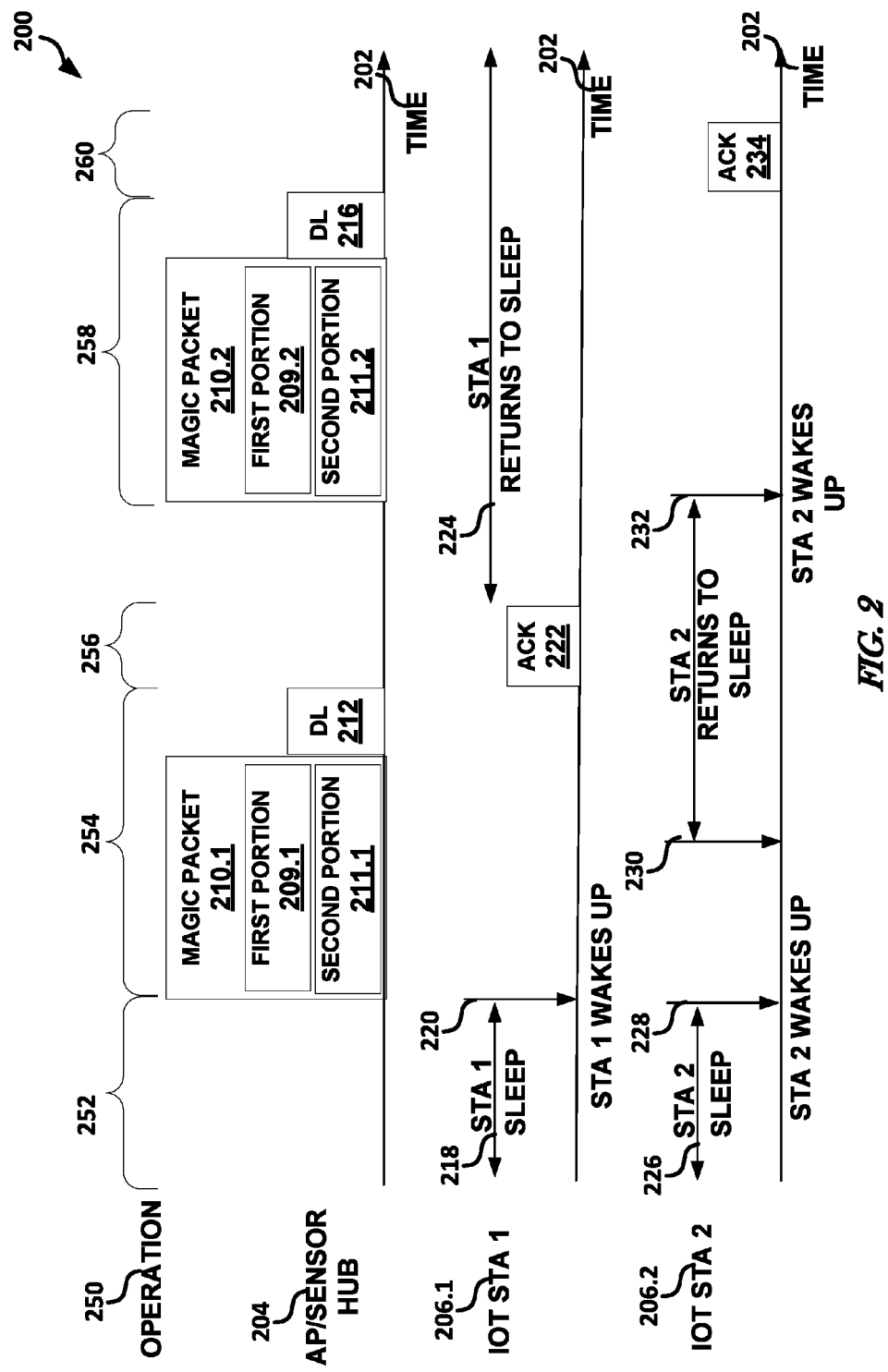
FIG. 2 illustrates a method for waking up Internet of Things (IoTs) devices in accord with one or more embodiments.

FIG. 2 illustrates a method 200 for waking up an IoT device in accord with one or more embodiments. Illustrated in FIG. 2 is time 202 along a horizontal axis and frequency along a vertical axis. Operations 250 are listed along the top. The device transmitting may be an AP/sensor hub 204, IoT STA 1 206.1, or IoT STA 2 206.2. The AP/Sensor hub 204 may be a master station 102 or sensor hub 110. The IoT STA 1 206.1 and IoT STA 2 206.2 may be IoT devices 108. The magic packet 210 may be the same or similar to magic packets 300, 400, 500 as described with regard to FIGS. 3-5.

The magic packet 210 may include a first portion 209 and a second portion 211. The first portion 209 may be a portion that includes a physical layer indication to the IoT devices 108. For example, the first portion 209 may be a common wake up PHY synchronization 310 that when decoded by the IoT device 108 indicates that the IoT device 108 should continue to decode the magic packet 210. The first portion 209 may provide timing synchronization. The IoT device 108 may partially wake-up after receiving the first portion 209 so that it can decode the second portion 211 which may be a MAC portion of the magic packet 210.

The second portion 211 may be a portion that includes an indication for a specific IoT device 108 or a group of IoT devices 108. In one or more embodiments, the second portion 211 may include the LRLP length 311. For example, the second portion 211 may be an STA/AP dedicated wake up preamble 312 as discussed with regard to FIG. 3. The magic packets 210 may be the same as or similar to magic packets 300, 400, 500 as described with regard to FIGS. 3-5. The magic packets 210 may be transmitted on a sub-channel that may be smaller than a channel bandwidth used by HEW STAs 104. For example, the sub-channel may be 2 MHz, about 2.03 MHz, or about 2.6 MHz. The second portion 211 may be a media access control (MAC) portion where the IoT STA 108 may wake-up portions of the IoT STA 108 so that the IoT STA 108 can decode a MAC portion of the magic packet 210.

The method 200 may begin at operation 252 where IoT STA 1 206.1 and IoT STA 2 206.2 are in a sleep 218, 226, respectively. The method 200 may continue at operation 254 with the AP/sensor hub 204 transmitting a magic packet 210.1. IoT STA 1 206.1 and IoT STA 2 206.2 may receive the magic packet 210.1. The magic packet 210.1 may begin with the first portion 209.1, such as a common wake up PHY synch 310 followed by the second portion 211, such as can include an LRLP length 311. In one or more embodiments, the magic packet 210.1 may have portions that are before the first portion 209.1.

The IoT STAs 206 may receive the first portion 209.1 of the magic packet 210.1 that includes a common wake up PHY synchronization 310. The IoT STAs 206, as illustrated in FIG. 2, determine that the first portion of the magic packet for STA 1 210 indicates that the IoT STAs 206 is to decode additional portions of the magic packet 210.1. Both IoT STAs 206 may wake-up from a sleep state to decode more of the magic packet 210.1. The magic packet 210.1 may include a second portion 211.1 that may be an STA/AP dedicated wake up preamble 312, such as may include the LRLP length 311.

IoT STA 2 206.2 may determine from the second portion 211.1 that the magic packet 210.1 is not directed to the IoT STA 2 206.2. IoT STA 2 206.2 may return to a sleep state 230. IoT STA 1 206.1 may determine based on the second portion 211.1 that the magic packet 210.1 is for the IoT STA 1 206.1. IoT STA 1 206.1 may continue to receive the remainder of the magic packet 210.1, which may include data or management instructions. The AP/sensor hub 204 may transmit downlink 212, which may be data or instructions, for the IoT STA 1 206.1, sometimes referred to as a "payload". The method 200 can continue at operation 256 with IoT STA 1 206.1 transmitting ACK 222. The IoT STA 206.1 may transmit an acknowledgement of the magic packet 210 and DL 212 to the AP/sensor hub 204. The IoT STA 206.1 may then return to a sleep state 224. The IoT STA 206.1 may enter the shallow sleep based on a schedule so that it will not wake up until a next beacon time or another pre-determined time.

The method 200 can continue at operation 258 with the AP/sensor hub 204 transmitting magic packet 210.2. IoT STA 206.1 may not decode any of magic packet 210.2 as IoT STA 206.1 may be in a sleep schedule and not wake-up until a pre-determined time, such as can be after the duration of the packet reception and the DL 216.

IoT STA 2 206.2 may receive the first portion 209.2 and determine to continue to decode the magic packet 210.2. IoT STA 2 206.2 may wake-up a portion of the IoT STA 2 206.2 to decode a MAC portion of the magic packet 210. The IoT STA 2 206.2 may determine based on the second portion 211.2 that the magic packet 210.2 is for the IoT STA 2 206.2. The IoT STA 2 206.2 may decode the remainder of the magic packet 210 and the DL 216, such as can include the LRLP length 311. The method 200 may continue at operation 260 with the IoT STA 206.2 transmitting an ACK 234 to the AP/sensor hub 204 to acknowledge the magic packet 210.2 and the DL 216. The IoT STA 2 206.2 may return to a shallow sleep and not wake-up until a predetermined time, such as can be based on a schedule.

IoT STAs 206 may be in scheduled or continuous sleep operation modes. During these continuous or sleep operation modes the IoT STAs 206 may be in a narrow band low power sleep mode where the IoT STAs 206 try to detect magic packets 210. The IoT STAs 206 may share their operating characteristics with the AP/Sensor hub 204 when they associate with the master station 102.

The IoT STAs 206 may be battery constrained so that it is better to keep the IoT STAs 206 in sleep mode as long as possible. The IoT STAs 206 may have pre-negotiated or assigned, predefined wake-up intervals. In one or more embodiments, the AP/sensor hub 204 may negotiate or assign wake-up intervals to the IoT STAs 206. In one or more embodiments, the IoT STAs 206 may wake-up in a predefined interval if the IoT STA 206 has a frame to transmit to the AP/sensor hub 204, or the IoT STA 206 receives the magic packet 210 by a portion of its circuitry that is powered on.

In one or more embodiments, the sub-channel 504 may be indicated to the IoT STA 206 by the AP/sensor hub 204. For example, the AP/sensor hub 204 may indicate which 20 MHz sub-channel and which sub-channel of the 20 MHz sub-channel for the IoT STA 206 to monitor for magic packets 210, 300, 400, 500.

Figure 3:
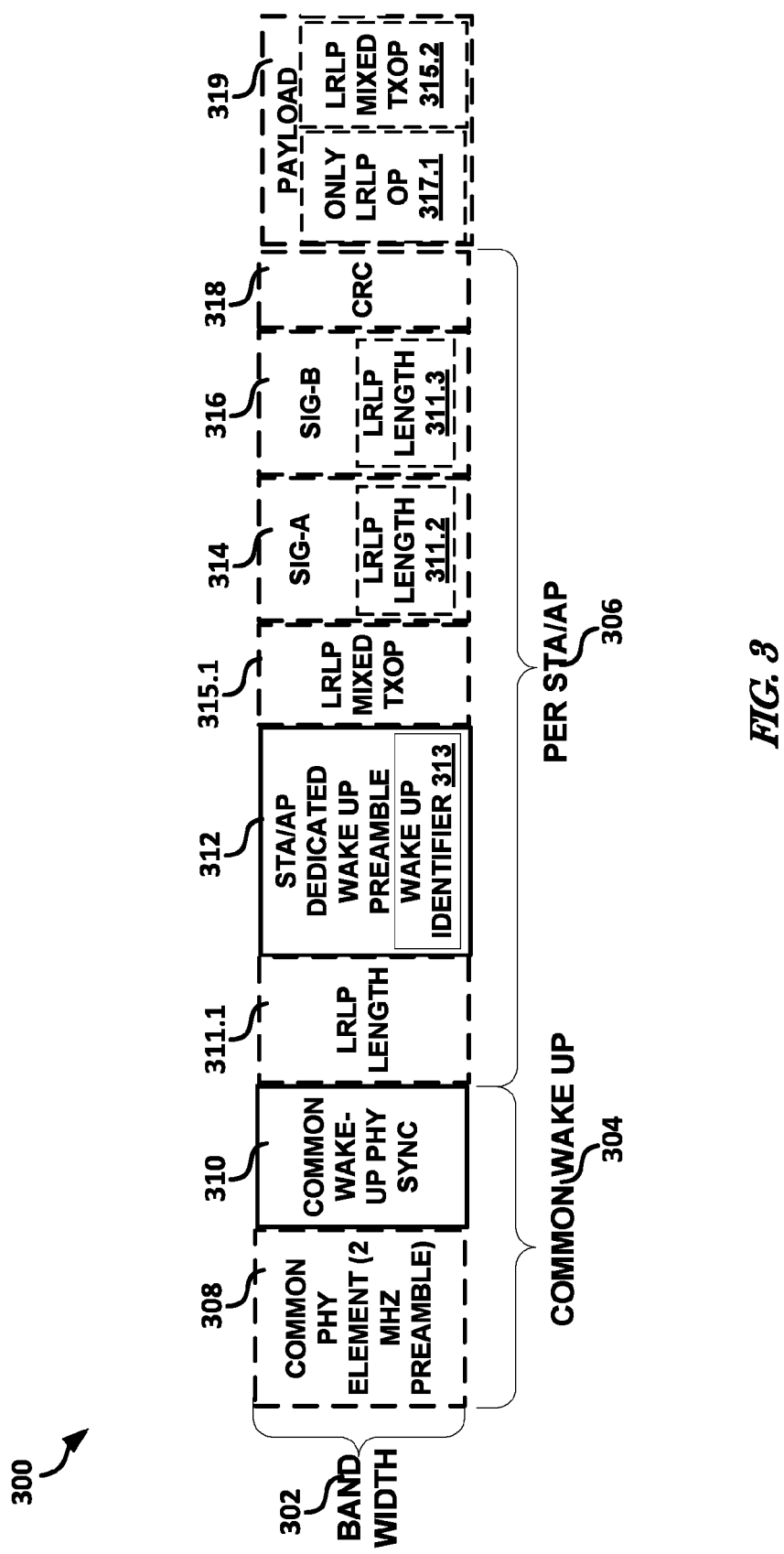
FIG. 3 illustrates a magic packet in accord with one or more embodiments.

FIG. 3 illustrates a magic packet 300 in accord with one or more embodiments. The magic packet 300 may include common PHY element 308 (optional), common wake-up PHY synchronization 310 (optional), LRLP length 311, STA/AP dedicated wake-up preamble 312, signal field A (SIG-A) 314 (optional), signal field B (SIG-B) 316 (optional), and cyclic redundancy check (CRC) 318 (optional). In one or more embodiments, the magic packet 300 comprises a common wake up 304 and a per STA/AP 306. The magic packet 300 may be transmitted on a sub-channel with a bandwidth 302 that is smaller than 20 MHz. For example, the magic packet 300 may be transmitted over a bandwidth 302 of 2.03 MHz, 2.6 MHz, or 2 MHz. In one or more embodiments, the magic packet 300 may be transmitted on 26 data tones.

In one or more embodiments, the magic packet 300 includes a common PHY element 308 and a common wake-up PHY synchronization 310. The common PHY element 308 and common wake-up PHY synchronization 310 provides time and frequency synchronization, respectively, for the IoT STAs 108.

The LRLP length 311.1 is illustrated as being a part of the "Per STA/AP" 306 portion of the LRLP packet. As alternatives, the LRLP length 311 can be indicated in the SIG-A 314 or SIG-B 316 fields of the LRLP preamble, such as is represented by the LRLP length 311.2 and 311.3, respectively. In one or more embodiments, the LRLP length 311 can include about 6 bits to about 16 bits, such as to indicate the length of the packet in units of bytes or symbols.

The STA/AP dedicated wake-up preamble 312 may be a training sequence. The STA/AP dedicated wake-up preamble 312 may include a wake-up identifier 313. The wake-up identifier 313 may be the training sequence. The wake-up identifier 313 may be unique signage that is negotiated when the IoT device 108 associates with the master station 102. The wake-up identifier 313 may indicate a specific device or it may be a group identifier.

Figure 6:
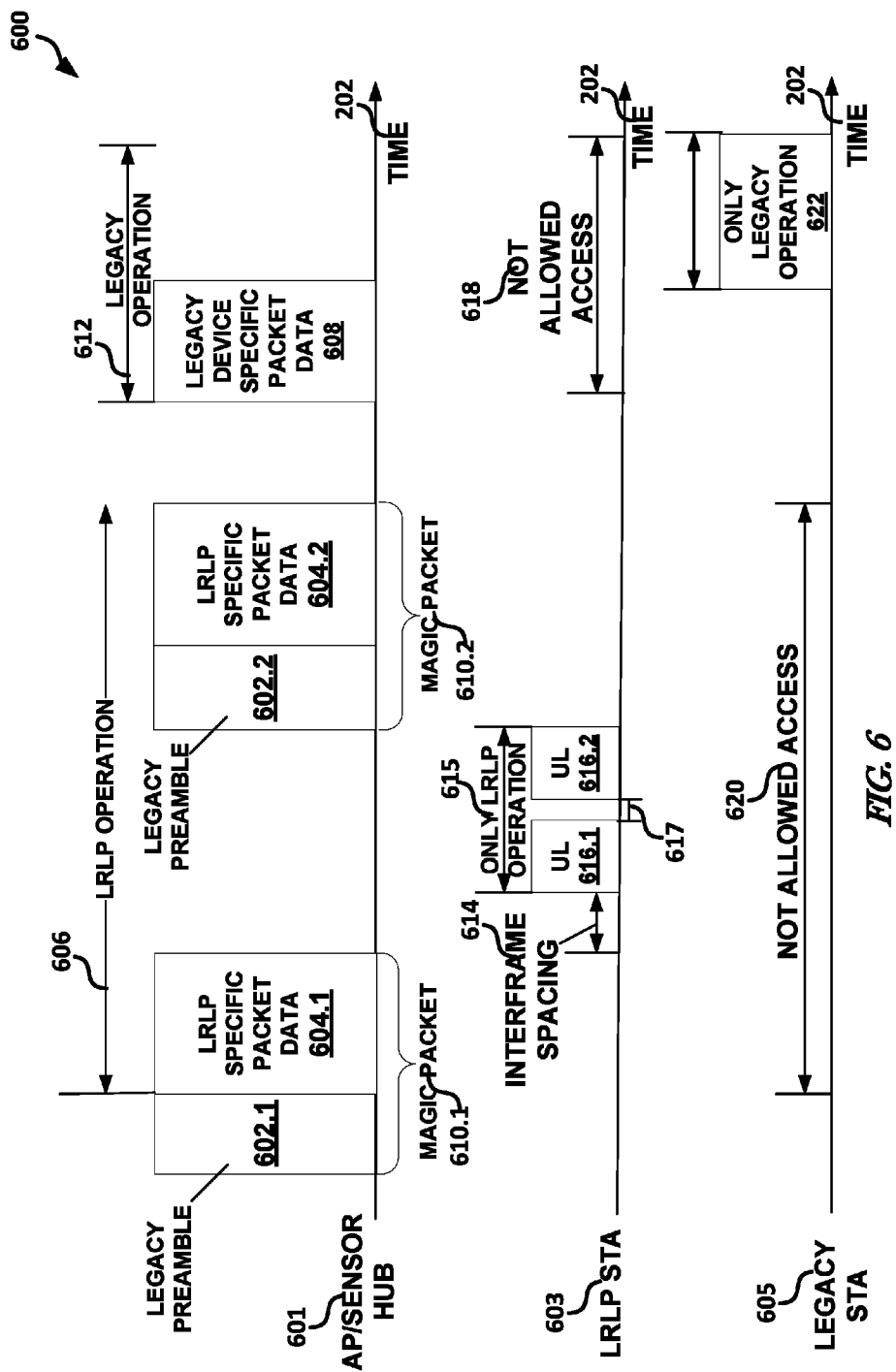
FIG. 6 illustrates a method of communicating packet duration or other information to an LRLP device.

The magic packet 300 as illustrated includes an optional LRLP-mixed-TXOP 315 that indicates a duration of an "LRLP Operation" (see FIG. 6). The duration of the LRLP operation (see FIG. 6) or the LRLP-MIXED-TXOP (a TXOP in which both legacy and LRLP devices (e.g., IoT STA 108) can access the media, note that the duration of the LRLP-MIXED-TXOP field can be the same duration as that of the of the LRLP operation) can be conveyed to the STA in either the Per STA/AP 306 portion of the LRLP packet or a payload 319 part of the LRLP packet. FIG. 3 illustrates both options, such as by the LRLP-MIXED-TXOP 315.1 and 315.2, respectively.

In one or more embodiments, the magic packet 300 includes a SIG-A 314 field. The SIG-A 314 field may include several sub-fields for the IoT STA 108 identified by STA/AP dedicated wake-up preamble 312. The sub-fields may include one or more of: an association identification (AID), a channel bandwidth (e.g., some frequency value), an indication of which of the possible four 20 MHz channels, a sub-channel bandwidth (e.g., some frequency value) and its location within the 20 MHz channel, and the LRLP length 311.2.

In one or more embodiments, the magic packet 300 includes a SIG-B 316 field. The SIG-B 316 field may include sub-fields for the IoT STA 108 identified by the STA/AP dedicated wake-up preamble 312. The sub-fields may include one or more of: an indication of a spatial stream for MU-MIMO, a modulation and coding scheme for subsequent portions of the magic packet 300, and the LRLP length 311.3.

In one or more embodiments, the magic packet 300 includes a CRC 318 field. The CRC 318 field may be used to verify that information that is sent is correct. The CRC 318 may include a cyclic redundancy check (CRC). The CRC 318 may reduce the probability of a mistaken wake-up of an IoT STA 108. In one or more embodiments, the master station 102 may determine to use the CRC 318 field if a misdetection probability is above a threshold.

In one or more embodiments, the magic packet 300 includes a payload 319. The payload 319 is illustrated as including optional LRLP mixed TXOP 315.2 and only LRLP operation 317.1 fields. The LRLP mixed TXOP 315, as discussed previously indicates a duration of mixed TXOP transmission time. The only LRLP operation 317 field indicates to the LRLP device (i.e. the IoT STA 108) when to start and end its operations. The duration in which the LRLP device is given access to the media can be dedicated to only LRLP devices. In one or more embodiments, the only LRLP operation 317 can start, such as via a pre-agreement, after an interframe spacing duration (see FIG. 6). In any case, a new field indicating a duration of an LRLP-dedicated-TXOP may be included in the DL transmission of the AP to LRLP device to convey the duration of "Only LRLP Operation" (see FIG. 6 for more explanation). Note that the magic packet 300 is an example of a DL transmission from the master station 102 (e.g., an AP) to the IoT STA 108 (e.g., an LRLP device).

Using one or more of the LRLP length 311, LRLP mixed TXOP 315, and only LRLP operation 317 fields allows the LRLP STAs (e.g., the IoT STAs 108) to set their NAV correctly and return to power save states, thereby reducing their power consumptions.

Figure 4:
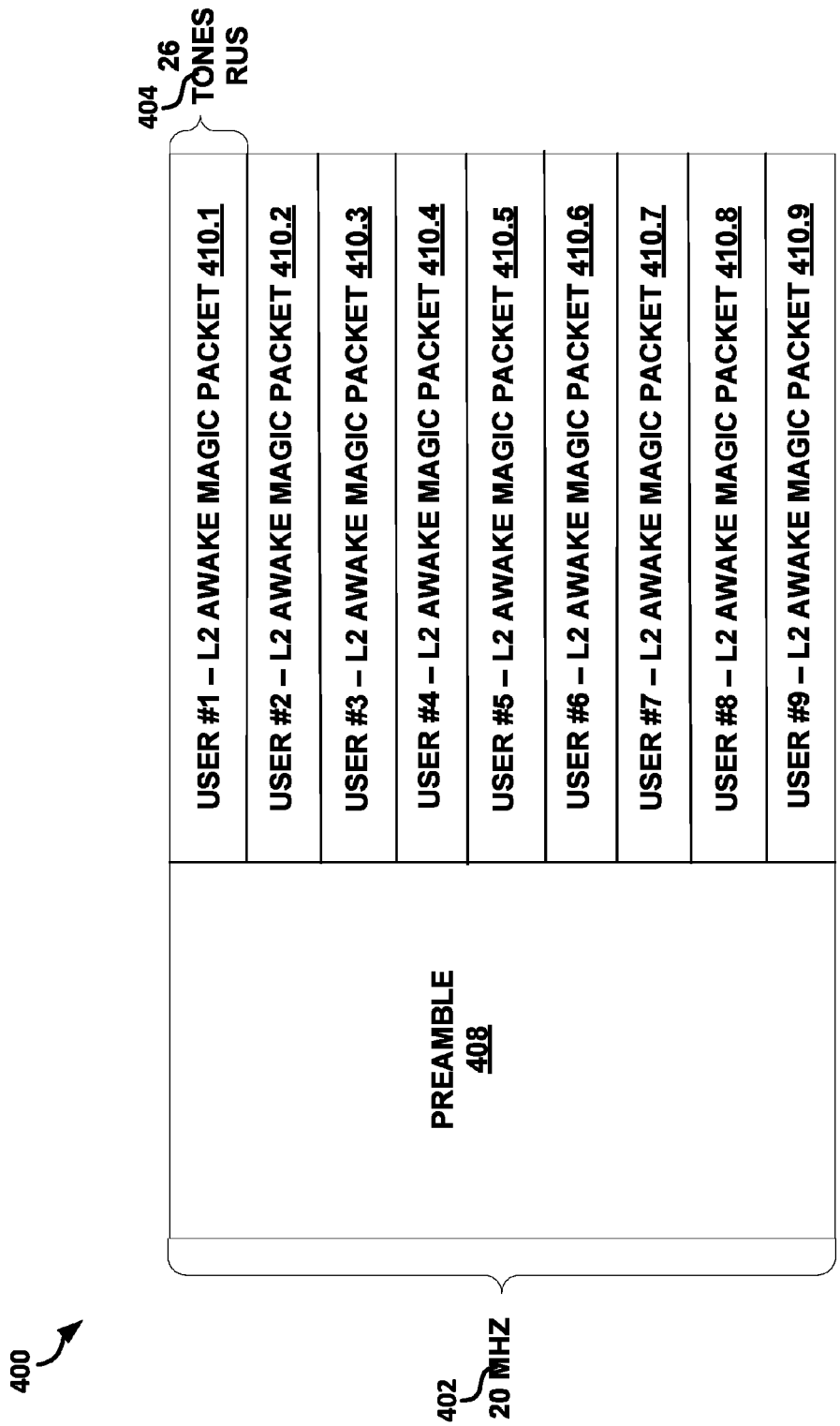
FIG. 4 illustrates nine magic packets in a 20 MHz sub-channel in accord with one or more embodiments.

FIG. 4 illustrates nine magic packets 400 in a 20 MHz sub-channel in accord with one or more embodiments. Illustrates in FIG. 4 is a preamble 408, and user #1-#9 L2 awake magic packets 410. FIG. 4 illustrates that the portion of the magic packet 400 for each IoT STA 108 may be combined and transmitted together with a preamble 408 that may be a legacy preamble. The preamble 408 may be a legacy preamble that is 20 µs in duration. Each user#1-#9 L2 awake magic packet 410 may be a 26 tone resource unit 404. Each user#1-#9 L2 awake magic packet 410 may be a magic packet 300 as described in conjunction with FIG. 3 with the wake-up identifier 313 identifying the corresponding user #.

Figure 5:
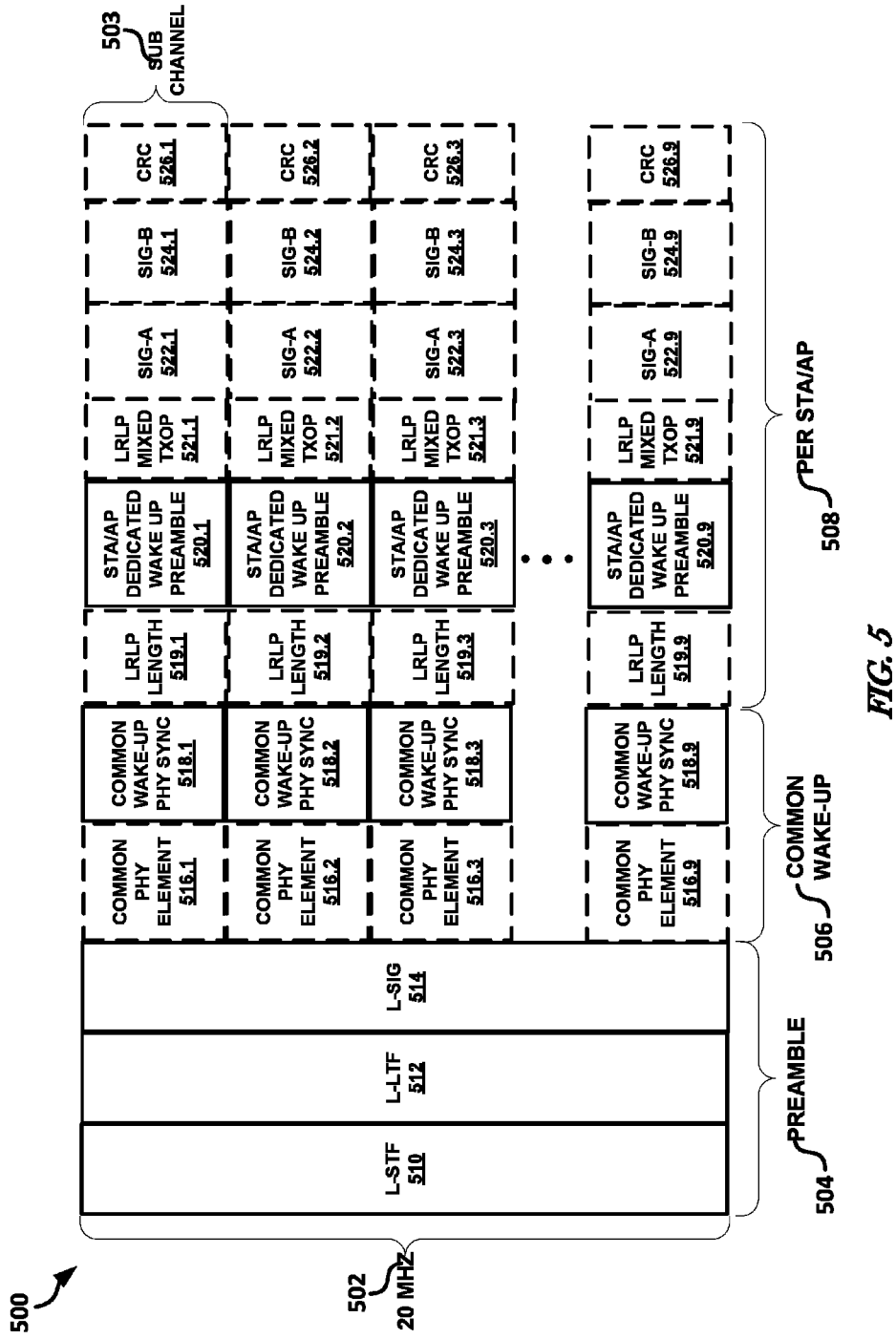
FIG. 5 illustrates a complete magic packet in accord with one or more embodiments.

FIG. 5 illustrates a complete magic packet 500 in accord with one or more embodiments. Illustrated in FIG. 5 is legacy 802.11 preamble 504, common wake-up 506, and per STA/AP 508. The complete magic packet 500 may be transmitted on a 20 MHz channel and each magic packet is transmitted on a sub-channel 504. Examples of the sub-channel 503 include 2 MHz, 2.03 MHz, 2.6 MHz or 26 data tones plus up to seven DC nulls. The legacy 802.11 preamble 504 may be a legacy preamble that is 20 µs in duration. The legacy 802.11 preamble 504 may include L-STF 510, L-LTF 512, and L-SIG 514, which may be the same or similar as described in conjunction with FIG. 3.

The common wake-up 506 includes common physical element 516 and common wake-up physical synchronization 518 which may be the same or similar as described in conjunction with FIG. 3. The per STA/AP 508 may include SIG-A 522, SIG-B 524, CRC 526, LRLP length 519, and STA/AP dedicated wake up preamble 520 which may be the same or similar as described in conjunction with FIG. 3.

One or more embodiments have the technical effect of extending the amount of time that IoT devices 108 may remain in sleep state and thus lowering the power consumption of the IoT devices 108. One or more embodiments have the technical effect of using less power by enabling the IoT devices 108 to remain in a sleep mode or shallow sleep mode for longer periods of time. For example, the first portion 208 (see FIG. 2) may enable the IoT devices 108 to keep a MAC layer decoder in a sleep mode until the first portion 208 is decoded.

While not illustrated in FIG. 5, each sub-channel 503 of the complete magic packet 500 may include a payload, such as is described with regard to FIG. 5.

FIG. 6 illustrates a method for communicating LRLP length, LRLP-mixed-TXOP duration/timing, and/or only LRLP operation duration/timing to an LRLP STA 603 and a legacy STA 605, in accord with one or more embodiments. Illustrated in FIG. 6 is time 202 along a horizontal axis and frequency along a vertical axis. The device transmitting may be an AP/sensor hub 601, LRLP STA 603, or a legacy STA 605. The AP/Sensor hub 601 may be similar to the AP/sensor hub 204. The LRLP STA 603 or legacy STA 605 may be IoT devices 108. The LRLP STA 603 is a bandwidth limited device (receive bandwidth less than 20 MHz) and the legacy STA 605 has a receive bandwidth of 20 MHz or greater. The magic packet 610 may be the same or similar to magic packets 300, 400, 500 as described with regard to FIGS. 3-5.

The magic packet 610 includes a legacy preamble 602 and LRLP specific packet data 604. For example, the legacy preamble 602 may include the preamble 504 or 408. The LRLP specific packet data 604 may include one or more fields as described with regard to the common wake-up, per STA/AP, and/or payload portions of the magic packet of FIGS. 2-5.

The method 600 as illustrated includes the AP/sensor hub 601 providing a magic packet 610 to the LRLP STA 603 and the legacy STA 605. The magic packet 610 may indicate to the LRLP STA 603 and the legacy STA 605 a time of LRLP operation 606 (sometimes referred to as LRLP mixed operation). This information can be provided in an LRLP-mixed-operation field, such as is previously described. The magic packet 610 may indicate an LRLP length to the LRLP STA 603. The LRLP length is discussed previously with regard to FIGS. 3 and 5 and elsewhere. The magic packet 610 may indicate to the LRLP STA 603 a time and duration of an only LRLP operation 615 time window. This time window indicates to the LRLP STA 603 a timeframe in which the LRLP STA 603 may contend for media access and/or perform one or more uplink (UL) operations, such as may be with or without contention.

The time between the end of the magic packet 610 and the beginning of the only LRLP operation 615 is an interframe spacing 614. During the interframe spacing 614, the STA 603 may prepare a UL transmission. In the only LRLP operation 615 the LRLP STA 603 can transmit UL 616 to the AP/sensor hub 601. The FIG. 6 illustrates two ULs 616.1 and 616.2 with a delta time 617 between ULs 616.1 and 616.2. The duration of the ULs 616.1 and 616.2 can be conveyed to the LRLP STA 603 in a prior DL transmission. Another LRLP STA (not shown in the FIG. 6) may transmit one more UL packets to the AP/sensor hub 601 during the delta time 617. Such transmission and its duration may also be conveyed to the STAs in a prior DL packet. Legacy devices may be prohibited from transmitting to the AP/sensor hub 601 during the only LRLP operation period 615, such as is indicated by not allowed access 620.

The method 600 may include transmitting another magic packet 610.2 to the STA 603 and 605. The magic packet 610.2 may include similar fields to the magic packet 610.1. The magic packet 610.2 may indicate that the next time period is for only legacy STAs 622 to DL and/or UL data from/to the AP sensor hub 601. The LRLP STAs 603 may go into a sleep or remain in a sleep mode for this time period and may be prohibited from accessing the AP/sensor hub 601 in this time period, such as is indicated by not allowed access 618. The legacy time period 612 can be conveyed to the STAs 605 in the packet 608. Note that this field is only decodable by the STA 603. The legacy STA 605 receives LRLP-MIXED-TXOP in the Length Field of L-SIG (in Legacy preamble). Note that LRLP device cannot decode Legacy preamble, and Legacy device can generally decode only the legacy portion of the magic packet (a Legacy device generally cannot decode the content of LRLP packet).

The method 600 may include providing legacy device specific packet data 608 to the legacy STA 605. The legacy device specific packet data 608 can require 20 MHz or greater receive bandwidth to decode.

Figure 7:
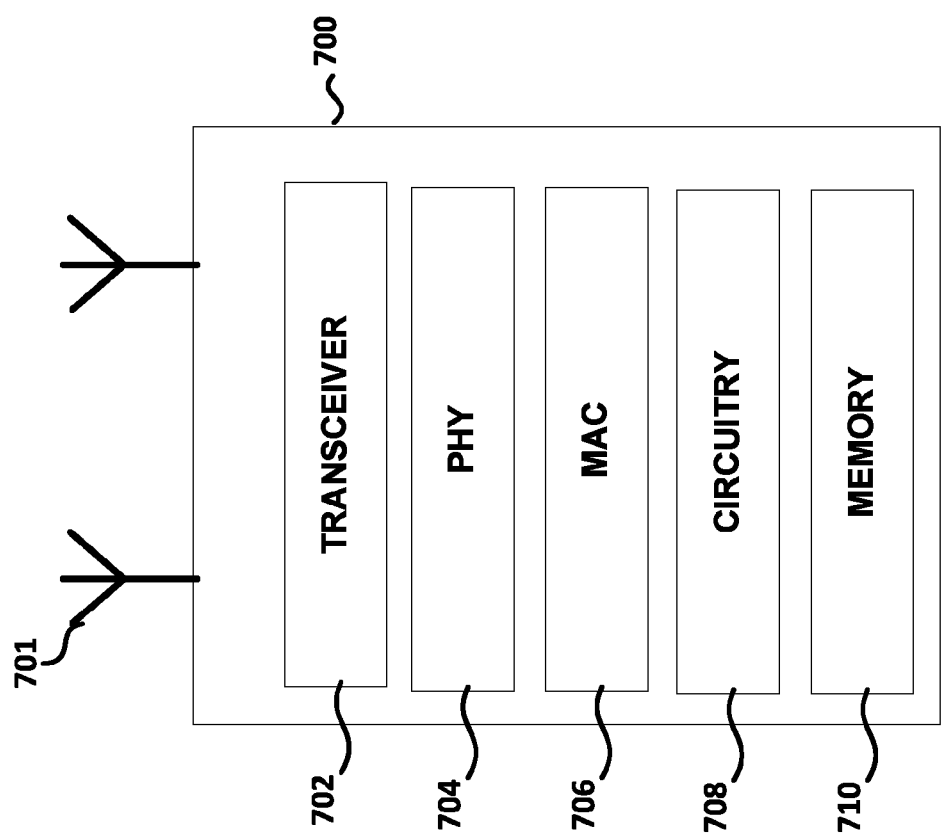
FIG. 7 illustrates a HEW device in accord with one or more embodiments.

FIG. 7 illustrates a device 700, such as a HEW or LRLP device in accord with one or more embodiments. The device 700 may be a HEW or LRLP compliant device that may be arranged to communicate with one or more other HEW devices, such as HEW STAs 104 (FIG. 1) or master station 102 (FIG. 1) as well as communicate with legacy devices 106 (FIG. 1) and/or IoT devices 108. HEW STAs 104 and legacy devices 106 may also be referred to as HEW devices and legacy STAs, respectively. The device 700 may be suitable for operating as master station 102 (FIG. 1) as a HEW STA 104 (FIG. 1), an LRLP device, and/or an IoT device 108. In accord with embodiments, the device 700 may include, among other things, a transmit/receive element 701 (for example an antenna), a transceiver 702, physical (PHY) circuitry 704, and media access control (MAC) circuitry 706. PHY circuitry 704 and MAC circuitry 706 may be HEW or LRLP compliant layers and may also be compliant with one or more IEEE 802.11 standards. MAC circuitry 706 may be arranged to configure packets such as a physical layer convergence procedure (PLCP) protocol data unit (PPDUs) and arranged to transmit and receive PPDUs, among other things. The device 700 may also include circuitry 708 and memory 710 configured to perform the various operations described herein. The circuitry 708 may be coupled to the transceiver 702, which may be coupled to the transmit/receive element 701. While FIG. 7 depicts the circuitry 708 and the transceiver 702 as separate components, the circuitry 708 and the transceiver 702 may be integrated together in an electronic package or chip.

In one or more embodiments, the MAC circuitry 706 may be arranged to contend for a wireless medium during a contention period to receive control of the medium for a control period and configure a HEW PPDU. In one or more embodiments, the MAC circuitry 706 may be arranged to contend for the wireless medium based on channel contention settings, a transmitting power level, and a CCA level.

The PHY circuitry 704 may be arranged to transmit a HEW PPDU. The PHY circuitry 704 may include circuitry for modulation/demodulation, upconversion/downconversion, filtering, amplification, etc. In one or more embodiments, the circuitry 708 may include one or more processors. The circuitry 708 may be configured to perform functions based on instructions being stored in a RAM or ROM, or based on special purpose circuitry. The circuitry 708 may include processing circuitry and/or transceiver circuitry in accord with one or more embodiments. The circuitry 708 may include a processor such as a general purpose processor or special purpose processor. The circuitry 708 may implement one or more functions associated with transmit/receive elements 701, the transceiver 702, the PHY circuitry 704, the MAC circuitry 706, and/or the memory 710.

In one or more embodiments, the circuitry 708 may be configured to perform one or more of the functions and/or methods described herein and/or in conjunction with FIGS. 1-6.

In one or more embodiments, the transmit/receive elements 701 may be two or more antennas that may be coupled to the PHY circuitry 704 and arranged for sending and receiving signals including transmission of the HEW or LRLP packets. The transceiver 702 may transmit and receive data such as HEW PPDU and packets that include an indication that the device 700 should adapt the channel contention settings according to settings included in the packet. The memory 710 may store information for configuring the other circuitry to perform operations for configuring and transmitting HEW or LRLP packets and performing the various operations to perform one or more of the functions and/or methods described herein and/or in conjunction with FIGS. 1-6.

In one or more embodiments, the device 700 may be configured to communicate using OFDM communication signals over a multicarrier communication channel. In one or more embodiments, the device 700 may be configured to communicate in accord with one or more specific communication standards, such as the Institute of Electrical and Electronics Engineers (IEEE) standards including IEEE 802.11-2012, 802.11n-2009, 802.11ac-2013, 802.11ax, 802.11ay, DensiFi, standards and/or proposed specifications for WLANs, or other standards as described in conjunction with FIG. 1, although the scope of the invention is not limited in this respect as they may also be suitable to transmit and/or receive communications in accord with other techniques and standards. In one or more embodiments, the device 700 may use 4× symbol duration of 802.11n or 802.11ac.

In one or more embodiments, the device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In one or more embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 701 may comprise one or more directional or omnidirectional antennas, including, for example, dipole antennas, monopole antennas, patch antennas, loop antennas, microstrip antennas or other types of antennas suitable for transmission of RF signals. In one or more multiple-input multiple-output (MIMO) embodiments, the antennas may be effectively separated to take advantage of spatial diversity and the different channel characteristics that may result.

Although the device 700 is illustrated as having several separate functional elements, one or more of the functional elements may be combined and may be implemented by combinations of software-configured elements, such as processing elements including digital signal processors (DSPs), and/or other hardware elements. For example, one or more elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In one or more embodiments, the functional elements may refer to one or more processes operating on one or more processing elements.

Figure 8:
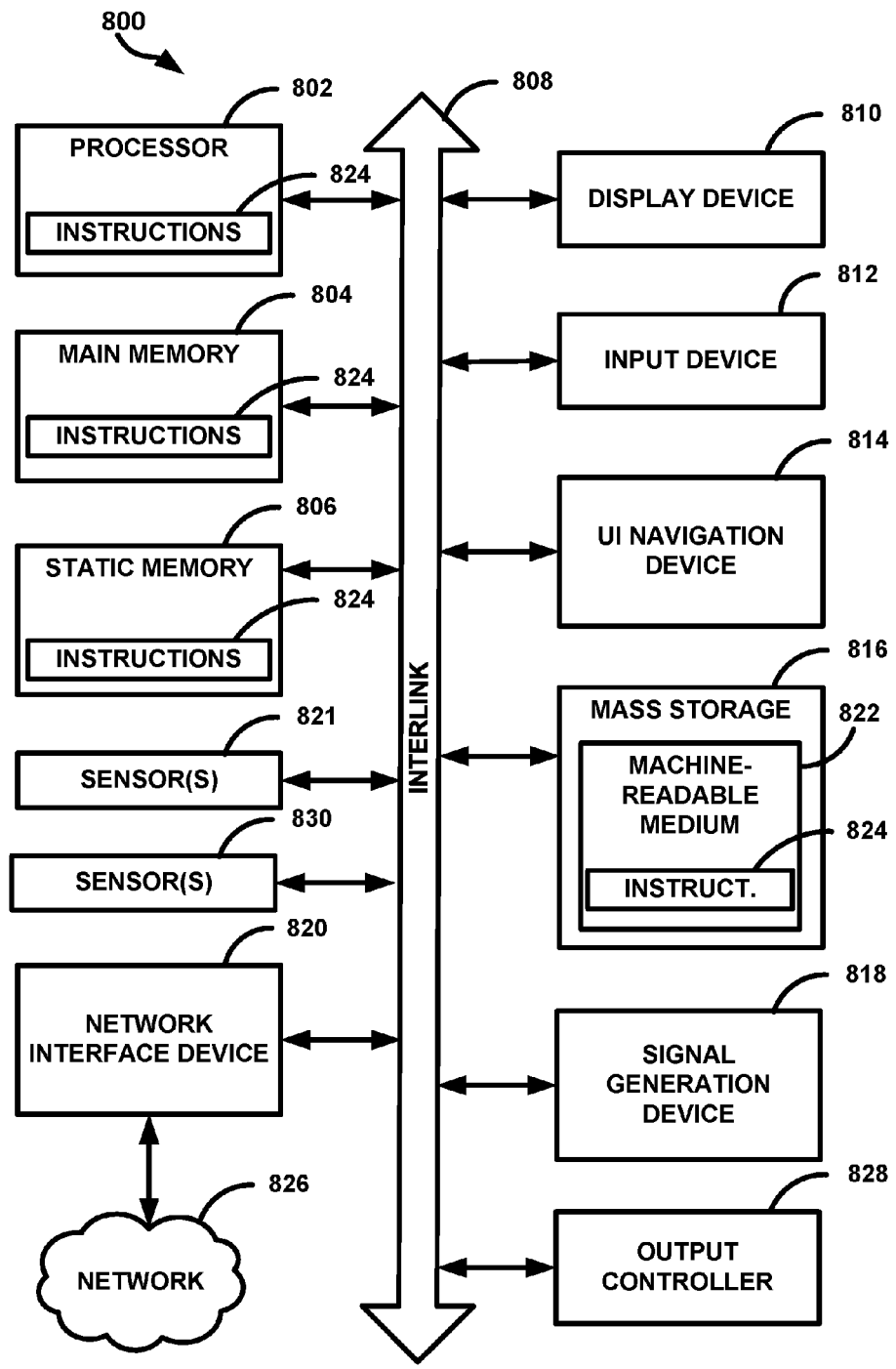
FIG. 8 illustrates device on which one or more of the methods discussed herein may be performed in accord with one or more embodiments.

FIG. 8 illustrates a block diagram of an example of a wired or wireless device 800 in accord with one or more embodiments. The device 800 (e.g., a machine) can operate so as to perform one or more of the techniques (e.g., methods) discussed herein. In alternative embodiments, the device 800 can operate as a standalone device or can be connected (e.g., networked) to other machines, such as the master station 102, the sensor hub 104, the legacy device 106, and/or the IoT device 108. The device 800 can be a part of the master station 102, the sensor hub 104, the legacy device 106, and/or the IoT device 108, as discussed herein. In a networked deployment, the device 800 can operate in the capacity of a server machine, a client machine, or both in server-client network environments. In an example, the device 800 can act as a peer machine in peer-to-peer (P2P) (or other distributed) network environment. The device 800 can include a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as an STA or sensor hub. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Device (e.g., computer system) 800 can include a hardware processor 802 (e.g., a central processing unit (CPU), a graphics processing unit (GPU), a hardware processor core, or any combination thereof), a main memory 804 and a static memory 806, some or all of which can communicate with each other via an interlink (e.g., bus) 808. The device 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The device 800 can additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The device 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The device 800 can include one or more radios 1130 (e.g., transmission, reception, or transceiver devices). The radios 830 can include one or more antennas to receive or transmit signal transmissions. The radios 830 can be coupled to or include the processor 802. The processor 802 can cause the radios 830 to perform one or more transmit or receive operations. Coupling the radios 830 to such a processor can be considered configuring the radio 830 to perform such operations. The radio 830 (e.g., transceiver) can be a communication network radio configured to communicate to an STA or other component of the communication network.

The storage device 816 can include a machine readable medium 822 on which is stored one or more sets of data structures or instructions 824 (e.g., software) embodying or utilized by any one or more of the techniques or functions described herein. The instructions 824 can also reside, completely or at least partially, within the main memory 804, within static memory 806, or within the hardware processor 802 during execution thereof by the device 800. In an example, one or any combination of the hardware processor 802, the main memory 804, the static memory 806, or the storage device 816 can constitute machine readable media.

While the machine readable medium 822 is illustrated as a single medium, the term "machine readable medium" can include a single medium or multiple media (e.g., a centralized or distributed database, and/or associated caches and servers) configured to store the one or more instructions 824.

The term "machine readable medium" can include any medium that is capable of storing, encoding, or carrying instructions for execution by the device 800 and that cause the device 800 to perform any one or more of the techniques of the present disclosure, or that is capable of storing, encoding or carrying data structures used by or associated with such instructions. Non-limiting machine readable medium examples can include solid-state memories, and optical and magnetic media.

The instructions 824 can further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 800, and includes digital or analog communications signals or other intangible medium to facilitate communication of such software.

The following examples pertain to one or more embodiments.

Example 1 can include or use subject matter (such as an apparatus, a method, a means for performing acts, or a device readable memory including instructions that, when performed by the device, can configure the device to perform acts), such as can include or use an apparatus of a high-efficiency (HE) access point (AP), the apparatus comprising processing circuitry and transceiver circuitry configured to generate a packet for transmission on one or more sub-channels for one or more stations, each sub-channel comprising a common wake-up physical synchronization for processing by a physical layer of the one or more stations, a station dedicated wake-up preamble for processing by one of (1) a physical layer and (2) a physical layer and a media access control (MAC) layer, and a packet length, wherein each station dedicated wake-up preamble comprises a wake-up identifier for a station of the one or more stations and the packet length indicates a duration of the packet, wherein a station of the one or more stations is capable of decoding information provided in a receive bandwidth of less than twenty megaHertz, and transmit the packet during a transmission opportunity (TXOP) obtained by the AP.

Example 2 can include or use, or can optionally be combined with the subject matter of Example 1, to include or use, wherein the processing circuitry and transceiver circuitry are further configured to generate the packet to include the packet length is in a dedicated field of the packet in a per station portion of the packet.

Example 3 can include or use, or can optionally be combined with the subject matter of at least one of Examples 1-2, to include or use, wherein the processing circuitry and transceiver circuitry are further configured to generate the packet to include the packet length in a signal-A (SIG-A) field of the packet in a per station portion of the packet.

Example 4 can include or use, or can optionally be combined with the subject matter of at least one of Examples 1-3, to include or use, wherein the processing circuitry and transceiver circuitry are further configured to generate the packet to include the packet length in a signal-B (SIG-B) field of the packet in a per station portion of the packet.

Example 5 can include or use, or can optionally be combined with the subject matter of at least one of Examples 1-4, to include or use, wherein the one or more stations include an LRLP station and a legacy station, and wherein the processing circuitry and transceiver circuitry are further configured to generate the packet to include long range low power (LRLP) mixed TXOP) data indicating a time frame in which one or more of the LRLP station and legacy station is to communicate with the apparatus.

Example 6 can include or use, or can optionally be combined with the subject matter of Example 5, to include or use, wherein the processing circuitry and transceiver circuitry are further configured to generate the packet to include the LRLP mixed TXOP data in a dedicated field of the packet in a per station portion of the packet.

Example 7 can include or use, or can optionally be combined with the subject matter of Example 5, to include or use, wherein the processing circuitry and transceiver circuitry are further configured to generate the packet to include the LRLP mixed TXOP data in a payload field of the packet.

Example 8 can include or use, or can optionally be combined with the subject matter of at least one of Examples 1-7, to include or use, wherein the one or more stations include an LRLP station and a legacy station, and wherein the processing circuitry and transceiver circuitry are further configured to generate the packet to include only long range low power (LRLP) data indicating a time frame in which only the LRLP station is to communicate with the AP and the legacy station is prohibited from communicating with the AP.

Example 9 can include or use, or can optionally be combined with the subject matter of at least one of Example 8, to include or use, wherein the processing circuitry and transceiver circuitry are further configured to generate the packet such that the only LRLP data is included in a payload field of the packet.

Example 10 can include or use, or can optionally be combined with the subject matter of at least one of Examples 1-9, to include or use, wherein the one or more sub-channels have a bandwidth of one the following group: 26 tones, 52 tones, and 106 tones, 242 tones, 484 tones, and 996 tones with tone spacing of 20/256 MHz and the packet is transmitted in accord with orthogonal frequency division multiple access (OFDMA).

Example 11 can include or use, or can optionally be combined with the subject matter of at least one of Examples 1-10, to include or use, wherein the packet is transmitted on a channel with a bandwidth of one of the following group: 2 mega Hertz (MHz), 2.03 MHz, 2.6 MHz, 5 MHz, 10 MHz, 20 MHz, 40 MHz, 80 MHz, 160 MHz, and 320 MHz.

Example 12 can include or use, or can optionally be combined with the subject matter of at least one of Examples 1-10, to include or use, wherein the packet further comprises a legacy short-training field (L-STF), a legacy long training field (L-LTF), and a legacy signal (L-SIG) field before the common wake up physical synchronization and wherein the L-STF, L-LTF, and L-SIG are transmitted in 20 MHz bandwidth increments to cover the entire bandwidth.

Example 13 can include or use, or can optionally be combined with the subject matter of Example 12, to include or use, wherein the one or more stations are constrained from decoding the L-STF, L-LTF, and L-SIG.

Example 14 can include or use, or can optionally be combined with the subject matter of at least one of Examples 1-1, to include or use, wherein the device is an Institute of Electrical and Electronic Engineers (IEEE) 802.11ax access point.

Example 15 can include or use, or can optionally be combined with the subject matter of at least one of Examples 1-14, to include or use, wherein the one more stations include one or more from the following group: an Long Range Low Power device, an Internet of Things (IoT) wireless device, a battery constrained device, an IEEE 802.11ax station, and a narrow bandwidth device of less than 20 MHz.

Example 16 can include or use, or can optionally be combined with the subject matter of at least one of Examples 1-15, to include or use, further comprising memory coupled to the processing circuitry and transceiver circuitry, and one or more antennas coupled to the transceiver circuitry.

Example 17 can include or use subject matter (such as an apparatus, a method, a means for performing acts, or a device readable memory including instructions that, when performed by the device, can configure the device to perform acts), such as can include or use a non-transitory computer-readable storage medium that stores instructions for execution by one or more processors, the instructions to configure the one or more processors to cause a wireless local-area network device to generate a packet for transmission on one or more sub-channels for one or more stations, each sub-channel comprising a common wake-up physical synchronization for processing by one of a physical layer of the one or more stations, a station dedicated wake-up preamble for processing by one of (1) a physical access layer and (2) a physical access layer and a media access control (MAC) layer, and a packet length, wherein each station dedicated wake-up preamble comprises a wake-up identifier for a station of the one or more stations and the packet length indicates a duration of the packet, and wherein a station of the one or more stations is capable of decoding a receive bandwidth of less than twenty megahertz, and transmit the packet to the one or more stations during a transmission opportunity (TXOP) obtained by the AP.

Example 18 can include or use, or can optionally be combined with the subject matter of Example 17, to include or use wherein the one or more sub-channels have a bandwidth of one the following group: 26 tones, 52 tones, 106 tones, 242 tones, 484 tones, and 996 tones with tone spacing of 20/256 MHz and the packet is transmitted in accord with orthogonal frequency division multiple access (OFDMA).

Example 19 can include or use, or can optionally be combined with the subject matter of at least one of Examples 17-18, to include or use, wherein the packet is transmitted on a channel with a bandwidth of about one of: 2 mega Hertz (MHz), 2.03 MHz, 2.6 MHz, 5 MHz, 10 MHz, 20 MHz, 40 MHz, 80 MHz, 160 MHz, and 320 MHz.

Example 20 can include or use, or can optionally be combined with the subject matter of at least one of Examples 17-19, to include or use, wherein the instructions further configure the one or more processors to cause a wireless local-area network device to generate the packet to include the packet length in one of the following group: a dedicated field of the packet in a per station/access point (STA/AP) portion of the packet, a signal A (SIG-A) field of the packet in a per station portion of the packet, and a signal B (SIG-B) field of the packet in a per station portion of the packet.

Example 21 can include or use, or can optionally be combined with the subject matter of at least one of Examples 17-20, to include or use, wherein the instructions further configure the one or more processors to cause a wireless local-area network device to generate the packet to include long range low power (LRLP) mixed transmit operation (TXOP) data indicating a time frame in which the station is to communicate with the apparatus, the LRLP mixed TXOP data is included in one of the following group a dedicated field of the packet in a per station portion of the packet and a payload field of the packet.

Example 22 can include or use subject matter (such as an apparatus, a method, a means for performing acts, or a device readable memory including instructions that, when performed by the device, can configure the device to perform acts), such as can include or use generating a packet for transmission on one or more sub-channels for one or more stations, each sub-channel comprising a common wake-up physical synchronization for processing by a physical layer of the one or more stations, a station dedicated wake-up preamble for processing by one of (1) a physical access layer and (2) a physical access layer and a media access control (MAC) layer of the one or more stations, and a packet length, wherein each station dedicated wake-up preamble comprises a wake-up identifier for a station of the one or more stations and the packet length indicates a duration of the packet and transmitting the packet to the one or more stations during a transmission opportunity (TXOP) obtained by the AP.

Example 23 can include or use, or can optionally be combined with the subject matter of Example 22, to include or use, wherein the stations includes a long range low power (LRLP) station and a legacy station.

Example 24 can include or use, or can optionally be combined with the subject matter of at least one of Examples 22-23, to include or use, wherein the one or more sub-channels have a bandwidth of one the following group: 26 tones, 52 tones, 106 tones, 242 tones, 484 tones, and 996 tones with tone spacing of 20/256 MHz.

Example 25 can include or use, or can optionally be combined with the subject matter of at least one of Examples 22-24, to include or use wherein transmitting the packet includes transmitting the packet in accord with orthogonal frequency division multiple access (OFDMA).

Example 26 can include or use, or can optionally be combined with the subject matter of at least one of Examples 22-25, to include or use, wherein transmitting the packet includes transmitting the packet on a channel with a bandwidth of one of about: 2 mega Hertz (MHz), 2.03 MHz, 2.6 MHz, 5 MHz, 10 MHz, 20 MHz, 40 MHz, 80 MHz, 160 MHz, and 320 MHz.

Example 27 can include or use, or can optionally be combined with the subject matter of at least one of Examples 22-26, to include or use, wherein generating the packet includes generating the packet to include the packet length in one of the following group: a dedicated field of the packet in a per station/access point (STA/AP) portion of the packet, a signal A (SIG-A) field of the packet in a per station/access point (STA/AP) portion of the packet, and a signal B (SIG-B) field of the packet in a per station/access point (STA/AP) portion of the packet.

Example 28 can include or use, or can optionally be combined with the subject matter of at least one of Examples 22-27, to include or use, wherein generating the packet includes generating the packet to include only LRLP data indicating a time frame in which only the LRLP station is to communicate with the apparatus and the legacy station prohibited from communicating with the apparatus, such that the only LRLP data is included in a payload field of the packet.

Example 29 can include or use subject matter (such as an apparatus, a method, a means for performing acts, or a device readable memory including instructions that, when performed by the device, can configure the device to perform acts), such as can include or use an apparatus of a high-efficiency (HE) station (STA), the apparatus comprising processing circuitry and transceiver circuitry configured to receive packet information on one or more sub-channels, each sub-channel comprising a common wake-up physical synchronization for processing by a physical layer of the one or more stations, a station dedicated wake-up preamble for processing by one of (1) a physical layer and (2) a physical layer and a media access control (MAC) layer, and a packet length, wherein each station dedicated wake-up preamble comprises a wake-up identifier for a station of the one or more stations and the packet length indicates a duration of the packet, decode the packet information, wherein the packet information is transmitted on a bandwidth of less than twenty megahertz, and receive a downlink from or provide an uplink to an access point (AP) that provided the packet information, the downlink received or uplink provided during a time dedicated to only long range low power device operation.

Example 30 can include or use, or can optionally be combined with the subject matter of Example 29, to include or use, wherein the processing circuitry and transceiver circuitry are further configured to decode the packet length, wherein the packet length is provided in a dedicated field of the packet in a per station portion of the packet.

Example 31 can include or use, or can optionally be combined with the subject matter of Example 29, to include or use, wherein the processing circuitry and transceiver circuitry are further configured to decode the packet length, wherein the packet length is provided in a signal-A (SIG-A) field of the packet in a per station portion of the packet.

Example 32 can include or use, or can optionally be combined with the subject matter of Example 29, to include or use, wherein the processing circuitry and transceiver circuitry are further configured to decode the packet length, wherein the packet length is provided in a signal-B (SIG-B) field of the packet in a per station portion of the packet, wherein the processing circuitry and transceiver circuitry are further configured to decode the packet length, wherein the packet length is provided in a dedicated field of the packet in a per station portion of the packet.

Example 33 can include or use, or can optionally be combined with the subject matter of at least one of Examples 29-32, to include or use, wherein the processing circuitry and transceiver circuitry are further configured to decode long range low power (LRLP) mixed TXOP data provided in the packet, the LRLP mixed TXOP indicating a time frame in which one or more of an LRLP station and a legacy station is to communicate with the AP.

Example 34 can include or use, or can optionally be combined with the subject matter of at least one of Examples 29-33, to include or use, wherein the processing circuitry and transceiver circuitry are further configured to decode the LRLP mixed TXOP data, wherein the LRLP mixed TXOP is provided in a dedicated field of the packet in a per station portion of the packet.

Example 35 can include or use, or can optionally be combined with the subject matter of at least one of Examples 29-33, to include or use, wherein the processing circuitry and transceiver circuitry are further configured to decode the LRLP mixed TXOP, wherein the LRLP mixed TXOP is provided data in a payload field of the packet.

Example 36 can include or use, or can optionally be combined with the subject matter of at least one of Examples 29-35, to include or use, wherein the processing circuitry and transceiver circuitry are further configured to decode only long range low power (LRLP) data, the only LRLP data indicating a time frame in which only the LRLP station is to communicate with the AP and a legacy station is prohibited from communicating with the AP.

Example 37 can include or use, or can optionally be combined with the subject matter of Example 36, to include or use, wherein the processing circuitry and transceiver circuitry are further configured to decode the only LRLP data, wherein the LRLP data is included in a payload field of the packet.

Example 38 can include or use, or can optionally be combined with the subject matter of at least one of Examples 29-37, to include or use, wherein the one or more sub-channels have a bandwidth of one the following group: 26 tones, 52 tones, and 106 tones, 242 tones, 484 tones, and 996 tones with tone spacing of 20/256 MHz and the packet is transmitted in accord with orthogonal frequency division multiple access (OFDMA).

Example 39 can include or use, or can optionally be combined with the subject matter of at least one of Examples 29-38, to include or use, wherein the packet is transmitted on a channel with a bandwidth of one of the following group about: 2 mega Hertz (MHz), 2.03 MHz, 2.6 MHz, 5 MHz, 10 MHz, 20 MHz, 40 MHz, 80 MHz, 160 MHz, and 320 MHz.

Example 40 can include or use, or can optionally be combined with the subject matter of Example 39, to include or use, wherein the packet further comprises a legacy short-training field (L-STF), a legacy long training field (L-LTF), and a legacy signal (L-SIG) field before the common wake up physical synchronization and wherein the L-STF, L-LTF, and L-SIG are transmitted in 20 MHz bandwidth increments to cover the entire bandwidth.

Example 41 can include or use, or can optionally be combined with the subject matter of Example 40, to include or use, wherein the LRLP station are constrained from decoding the L-STF, L-LTF, and L-SIG.

Example 42 can include or use, or can optionally be combined with the subject matter of at least one of Examples 29-41, to include or use, wherein the apparatus is an Institute of Electrical and Electronic Engineers (IEEE) 802.11ax station.

Example 43 can include or use, or can optionally be combined with the subject matter of at least one of Examples 29-42, to include or use, wherein the station includes one or more from the following group: an Long Range Low Power device, an Internet of Things (IoT) wireless device, a battery constrained device, an IEEE 802.11ax station, and a narrow bandwidth device of less than 20 MHz.

Example 44 can include or use, or can optionally be combined with the subject matter of at least one of Examples 29-43, to include or use memory coupled to the processing circuitry and transceiver circuitry, and one or more antennas coupled to the transceiver circuitry.

Example 45 can include or use subject matter (such as an apparatus, a method, a means for performing acts, or a device readable memory including instructions that, when performed by the device, can configure the device to perform acts), such as can include or use non-transitory computer-readable storage medium that stores instructions for execution by one or more processors, the instructions to configure the one or more processors to cause a wireless local-area network device to receive packet information on one or more sub-channels, each sub-channel comprising a common wake-up physical synchronization for processing by a physical layer of the one or more stations, a station dedicated wake-up preamble for processing by one of (1) a physical layer and (2) a physical layer and a media access control (MAC) layer, and a packet length, wherein each station dedicated wake-up preamble comprises a wake-up identifier for a station of the one or more stations and the packet length indicates a duration of the packet, decode the packet information, wherein the packet information is transmitted on a bandwidth of less than twenty megahertz, and receive a downlink from or provide an uplink to an access point (AP) that provided the packet information, the downlink received or uplink provided during a time dedicated to only long range low power device operation.

Example 46 can include or use, or can optionally be combined with the subject matter of Example 45, to include or use, wherein the one or more sub-channels have a bandwidth of one the following group: 26 tones, 52 tones, 106 tones, 242 tones, 484 tones, and 996 tones with tone spacing of 20/256 MHz and the packet is transmitted in accord with orthogonal frequency division multiple access (OFDMA).

Example 47 can include or use, or can optionally be combined with the subject matter of at least one of Examples 45-46, to include or use, the packet is transmitted on a channel with a bandwidth of one of about: 2 mega Hertz (MHz), 2.03 MHz, 2.6 MHz, 5 MHz, 10 MHz, 20 MHz, 40 MHz, 80 MHz, 160 MHz, and 320 MHz.

Example 48 can include or use, or can optionally be combined with the subject matter of at least one of Examples 45-47, to include or use, wherein the instructions further configure the one or more processors to cause a wireless local-area network device to decode the packet with the packet length in one of the following group: a dedicated field of the packet in a per station/access point (STA/AP) portion of the packet, a signal A (SIG-A) field of the packet in a per station portion of the packet, and a signal B (SIG-B) field of the packet in a per station portion of the packet.

Example 49 can include or use, or can optionally be combined with the subject matter of at least one of Examples 45-48, to include or use, wherein the instructions further configure the one or more processors to cause a wireless local-area network device to decode the packet with long range low power (LRLP) mixed transmit operation (TXOP) data indicating a time frame in which the station is to communicate with the apparatus, the LRLP mixed TXOP data is included in one of the following group: a dedicated field of the packet in a per station portion of the packet and a payload field of the packet.

Example 50 can include or use subject matter (such as an apparatus, a method, a means for performing acts, or a device readable memory including instructions that, when performed by the device, can configure the device to perform acts), such as can include or use a method performed by a wireless local-area network device, the method comprising receiving packet information on one or more sub-channels, each sub-channel comprising a common wake-up physical synchronization for processing by a physical layer of the one or more stations, a station dedicated wake-up preamble for processing by one of (1) a physical layer and (2) a physical layer and a media access control (MAC) layer, and a packet length, wherein each station dedicated wake-up preamble comprises a wake-up identifier for a station of the one or more stations and the packet length indicates a duration of the packet, decoding the packet information, wherein the packet information is transmitted on a bandwidth of less than twenty megahertz, and receiving a downlink from or provide an uplink to an access point (AP) that provided the packet information, the downlink received or uplink provided during a time dedicated to only long range low power device operation.

Example 51 can include or use, or can optionally be combined with the subject matter of Example 50, to include or use, wherein the one or more sub-channels have a bandwidth of one the following group: 26 tones, 52 tones, 106 tones, 242 tones, 484 tones, and 996 tones with tone spacing of 20/256 MHz and the packet is transmitted in accord with orthogonal frequency division multiple access (OFDMA).

Example 52 can include or use, or can optionally be combined with the subject matter of at least one Examples 50-51, to include or use, wherein the packet is transmitted on a channel with a bandwidth of one of about: 2 mega Hertz (MHz), 2.03 MHz, 2.6 MHz, 5 MHz, 10 MHz, 20 MHz, 40 MHz, 80 MHz, 160 MHz, and 320 MHz.

Example 53 can include or use, or can optionally be combined with the subject matter of at least one Examples 50-52, to include or use, wherein decoding the packet includes decoding the packet with the packet length in one of the following group: a dedicated field of the packet in a per station/access point (STA/AP) portion of the packet, a signal A (SIG-A) field of the packet in a per station portion of the packet, and a signal B (SIG-B) field of the packet in a per station portion of the packet.

Example 54 can include or use, or can optionally be combined with the subject matter of at least one Examples 50-53, to include or use wherein decoding the packet includes decoding the packet with long range low power (LRLP) mixed transmit operation (TXOP) data indicating a time frame in which the station is to communicate with the apparatus, the LRLP mixed TXOP data is included in one of the following group: a dedicated field of the packet in a per station portion of the packet and a payload field of the packet.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP), the apparatus comprising:
   processing circuitry configured to generate a packet for transmission on one or more sub-channels for one or more stations, the packet comprising a common wake-up physical synchronization for processing by a physical layer of the one or more stations, a station dedicated wake-up preamble for processing by one of (1) a physical layer and (2) a physical layer and a media access control (MAC) layer, and a packet length, wherein each station dedicated wake-up preamble comprises a wake-up identifier for a station of the one or more stations and the packet length indicates a duration of the packet, and wherein a station of the one or more stations is capable of decoding a receive bandwidth of less than twenty megaHertz; and
   transceiver circuitry configured to transmit the packet to the one or more stations during a transmission opportunity (TXOP) obtained by the AP.

2. The apparatus of claim 1, wherein the processing circuitry is further configured to:
   generate the packet to include the packet length is in a dedicated field of the packet in a per station portion of the packet.

3. The apparatus of claim 1, wherein the processing circuitry is further configured to:
   generate the packet to include the packet length in a signal-A (SIG-A) field of the packet in a per station portion of the packet.

4. The apparatus of claim 1, wherein the processing circuitry is further configured to:
   generate the packet to include the packet length in a signal-B (SIG-B) field of the packet in a per station portion of the packet.

5. The apparatus of claim 1, wherein the one or more stations include an LRLP station and a legacy station, and wherein the processing circuitry is further configured to:
   generate the packet to include long range low power (LRLP) mixed TXOP) data indicating a time frame in which one or more of the LRLP station and legacy station is to communicate with the apparatus.

6. The apparatus of claim 5, wherein the processing circuitry is further configured to:
   generate the packet to include the LRLP mixed TXOP data in a dedicated field of the packet in a per station portion of the packet.

7. The apparatus of claim 5, wherein the processing circuitry is further configured to:
   generate the packet to include the LRLP mixed TXOP data in a payload field of the packet.

8. The apparatus of claim 1, wherein the one or more stations include an LRLP station and a legacy station, and wherein the processing circuitry is further configured to:

generate the packet to include only long range low power (LRLP) data indicating a time frame in which only the LRLP station is to communicate with the AP and the legacy station is prohibited from communicating with the AP.

9. The apparatus of claim 8, wherein the processing circuitry is further configured to:
generate the packet such that the only LRLP data is included in a payload field of the packet.

10. The apparatus of claim 1, wherein the one or more sub-channels have a bandwidth of one of the following group: 26 tones, 52 tones, and 106 tones, 242 tones, 484 tones, and 996 tones with tone spacing of 20/256 MHz and the packet is transmitted in accord with orthogonal frequency division multiple access (OFDMA).

11. The apparatus of claim 10, wherein the packet is transmitted on a channel with a bandwidth of one of the following group about: 2 mega Hertz (MHz), 2.03 MHz, 2.6 MHz, 5 MHz, 10 MHz, 20 MHz, 40 MHz, 80 MHz, 160 MHz, and 320 MHz.

12. The apparatus of claim 11, wherein the packet further comprises a legacy short-training field (L-STF), a legacy long training field (L-LTF), and a legacy signal (L-SIG) field before the common wake up physical synchronization and wherein the L-STF, L-LTF, and L-SIG are transmitted in 20 MHz bandwidth increments to cover the entire bandwidth.

13. The apparatus of claim 12, wherein the one or more stations are constrained from decoding the L-STF, L-LTF, and L-SIG.

14. The apparatus of claim 1, wherein the access point is an Institute of Electrical and Electronic Engineers (IEEE) 802.1 lax access point.

15. The apparatus of claim 1, wherein the one more stations include one or more from the following group: an Long Range Low Power device, an Internet of Things (loT) wireless device, a battery constrained device, an IEEE 802.11ax station, and a narrow bandwidth device of less than 20 MHz.

16. The apparatus of claim 1 further comprising memory coupled to the processing circuitry and transceiver circuitry, and one or more antennas coupled to the transceiver circuitry.

17. A non-transitory computer-readable storage medium that stores instructions for execution by one or more processors, the instructions to configure the one or more processors to cause a wireless local-area network device to:
generate a packet for transmission on one or more sub-channels for one or more stations, the packet comprising a common wake-up physical synchronization for processing by one of a physical layer of the one or more stations, a station dedicated wake-up preamble for processing by one of (1) a physical access layer and (2) a physical access layer and a media access control (MAC) layer, and a packet length, wherein each station dedicated wake-up preamble comprises a wake-up identifier for a station of the one or more stations and the packet length indicates a duration of the packet, and wherein a station of the one or more stations is capable of decoding a receive bandwidth of less than twenty megaHertz; and
transmit the packet to the one or more stations during a transmission opportunity (TXOP) obtained by the AP.

18. The non-transitory computer-readable storage medium of claim 17, wherein:
the one or more sub-channels have a bandwidth of one the following group: 26 tones, 52 tones, 106 tones, 242 tones, 484 tones, and 996 tones with tone spacing of 20/256 MHz and the packet is transmitted in accord with orthogonal frequency division multiple access (OFDMA),
the packet is transmitted on a channel with a bandwidth of one of about: 2 mega Hertz (MHz), 2.03 MHz, 2.6 MHz, 5 MHz, 10 MHz, 20 MHz, 40 MHz, 80 MHz, 160 MHz, and 320 MHz,
the instructions further include instructions that configure the one or more processors to cause the local-area network device to generate the packet to include the packet length in one of the following group: a dedicated field of the packet in a per station/access point (STA/AP) portion of the packet, a signal A (SIG-A) field of the packet in a per station portion of the packet, and a signal B (SIG-B) field of the packet in a per station portion of the packet, and
generate the packet to include long range low power (LRLP) mixed transmit operation (TXOP) data indicating a time frame in which the station is to communicate with the apparatus, the LRLP mixed TXOP data is included in one of the following group: a dedicated field of the packet in a per station portion of the packet and a payload field of the packet.

19. A method performed by a wireless local-area network device, the method comprising:
generating a packet for transmission on one or more sub-channels for one or more stations, the packet comprising a common wake-up physical synchronization for processing by a physical layer of the one or more stations, a station dedicated wake-up preamble for processing by one of (1) a physical access layer and (2) a physical access layer and a media access control (MAC) layer of the one or more stations, and a packet length, wherein each station dedicated wake-up preamble comprises a wake-up identifier for a station of the one or more stations and the packet length indicates a duration of the packet; and
transmitting the packet to the one or more stations during a transmission opportunity (TXOP) obtained by the AP.

20. The method of claim 19, wherein:
the stations include a long range low power (LRLP) station and a legacy station,
the one or more sub-channels have a bandwidth of one the following group: 26 tones, 52 tones, 106 tones, 242 tones, 484 tones, and 996 tones with tone spacing of 20/256 MHz,
transmitting the packet includes transmitting the packet in accord with orthogonal frequency division multiple access (OFDMA),
transmitting the packet includes transmitting the packet on a channel with a bandwidth of one of about: 2 mega Hertz (MHz), 2.03 MHz, 2.6 MHz, 5 MHz, 10 MHz, 20 MHz, 40 MHz, 80 MHz, 160 MHz, and 320 MHz,
generating the packet includes generating the packet to include the packet length in one of the following group: a dedicated field of the packet in a per station/access point (STA/AP) portion of the packet, a signal A (SIG-A) field of the packet in a per station/access point (STA/AP) portion of the packet, and a signal B (SIG-B) field of the packet in a per station/access point (STA/AP) portion of the packet, and
generating the packet includes generating the packet to include only LRLP data indicating a time frame in which only the LRLP station is to communicate with the apparatus and the legacy station prohibited from communicating with the apparatus, such that the only LRLP data is included in a payload field of the packet.

\* \* \* \* \*

UNITED STATES PATENT AND TRADEMARK OFFICE
CERTIFICATE OF CORRECTION

PATENT NO. : 9,883,473 B2
APPLICATION NO. : 14/973217
DATED : January 30, 2018
INVENTOR(S) : Azizi et al.

Page 1 of 1

It is certified that error appears in the above-identified patent and that said Letters Patent is hereby corrected as shown below:

In the Claims

In Column 22, Line 53, in Claim 5, delete "TXOP)" and insert --TXOP-- therefor

In Column 23, Line 32, in Claim 14, delete "802.1 lax" and insert --802.11ax-- therefor In Column 23, Line 35, in Claim 15, delete "(loT)" and insert --(IoT)-- therefor Signed and Sealed this
Eighteenth Day of June, 2019

Andrei Iancu
*Director of the United States Patent and Trademark Office*